United States Patent [19]
Ohnishi et al.

[11] 3,846,454
[45] Nov. 5, 1974

[54] PROCESS FOR PREPARING 2,3,6-TRIMETHYLBENZOQUINONE

[75] Inventors: Hajime Ohnishi; Yuji Nakazawa, both of Saitama, Japan

[73] Assignee: Daicel Ltd., Osaka, Japan

[22] Filed: Sept. 13, 1973

[21] Appl. No.: 396,827

[52] U.S. Cl. ............................................ 260/396 R
[51] Int. Cl. ............................................ C07c 49/64
[58] Field of Search ................................ 260/396 R

[56] References Cited
UNITED STATES PATENTS
2,804,473   8/1957   Phillips............................. 260/396 R Primary Examiner—Vivian Garner
Attorney, Agent, or Firm—Woodhams, Blanchard and Flynn

[57] ABSTRACT

2,3,6-Trimethylbenzoquinone is prepared by reacting pseudocumene with a weak peracid having a pKa above 7.0 in the presence of a strong acid having a pKa below 3.0 or a Lewis acid.

7 Claims, No Drawings

PROCESS FOR PREPARING 2,3,6-TRIMETHYLBENZOQUINONE

BACKGROUND OF THE INVENTION

1. Field of the Invention

This invention relates to a process for preparing 2,3,6-trimethylbenzoquinone by a simplified procedure in which pseudocumene is oxidized with a peracid solution in the presence of an acid catalyst.

2. Description of the Prior Art 2,3,6-Trimethylbenzoquinone can be reduced to 2,3,6-trimethylhydroquinone, which is known to be an important starting material for the synthesis of vitamin E. Although various processes for preparing 2,3,6-trimethylbenzoquinone have been proposed, many of them have been not advantageous from a commercial viewpoint, because they require either starting materials which are not readily available, or a complicated unit reaction procedure or special reagents. For example, a known process wherein pseudocumene is used as a starting material requires a series of unit reaction procedures in a step of introducing hydroxyl groups into the nucleus, i.e., sulfonation or bromination followed by nitration, reduction and oxidation, even though the starting material is readily available. In addition, according to this process, a large amount of by-products are formed and the steps are complicated and lengthy.

R. D. Chamber, et al, proposed in J. Chem. Soc. 1804 (1959) a process for obtaining 2,3,6-trimethylbenzoquinone from pseudocumene by the use of trifluoroperacetic acid. However, there has not been reported a process for preparing 2,3,6-trimethylbenzoquinone from pseudocumene by using a peracid weaker than trifluoroperacetic acid, for example, peracetic acid or perpropionic acid, as shown in Table I.

Table I

| Acid | pKa |
| --- | --- |
| Peracetic acid | 8.2 |
| Perpropionic acid | 8.1 |
| Perbutyric acid | 8.2 |
| Monochloroperacetic acid | 7.2 |
| Perbenzoic acid | 7.8 |
| Perphthalic acid | 8.2 |
| Performic acid | 7.1 |
| Trifluoroperacetic acid | 8.7 |

SUMMARY OF THE INVENTION

This invention relates to a process for preparing 2,3,6-trimethylbenzoquinone, characterized in that pseudocumene is oxidized with a weak peracid in the presence of an acid catalyst to obtain 2,3,6-trimethylbenzoquinone by a one step reaction.

The purpose of the present invention can be attained by using a stable peracid such as peracetic acid, instead of using an expensive and corrosive peracid such as trifluoroperacetic acid, in the presence of a strong acid of a pKa below 3.0 or a Lewis acid as catalyst.

If pseudocumene and peracetic acid are reacted in the absence of acid catalyst, the desired product 2,3,6-trimethylbenzoquinone is obtained in only a trace amount. The purpose of the present invention can be attained only by carrying out the reaction in the presence of an acid catalyst.

More particularly, the peracids used in the present invention are weak peracids having a dissociation constant (pKa) of above 7.0 such as peracetic acid, perpropionic acid, perbutyric acid, perbenzoic acid and perphthalic acid as shown in Table 1. The amount of the peracid employed is 1 to 10 moles, preferably 2 to 5 moles, per mole of pseudocumene.

The catalyst used in the present invention is a strong acid having a pKa of less than 3.0 or a Lewis acid. As strong acids, there may be mentioned, for example, perchloric acid, periodic acid, sulfuric acid, nitric acid, p-toluenesulfonic acid, phosphoric acid, phosphorous acid and fluoroboric acid. As Lewis acids, there may be mentioned for example, boron trifluoride, mercuric chloride and zinc chloride. A mixture of these acids can also be used. The catalyst is used in an amount of 1 to 150 wt. percent, preferably 3 to 20 wt. percent, based on the weight of pseudocumene.

In carrying out the process of the present invention, the use of a solvent is preferred. Particularly, the selectivity can be increased remarkably if a lower carboxylic acid such as acetic acid, propionic acid or butyric acid, or a chlorinated hydrocarbon such as chlorobenzene, dichloromethane, chloroform, carbon tetrachloride, trichloroethylene or tetrachloroethylene is used. The amount of the solvent is from 3 to 20 times the weight of pseudocumene.

The process of the present invention is carried out at a temperature such that the reaction is accelerated while the peracid does not become unstable, usually at 0° to 100°C. The reaction time varies depending on the reaction temperature.

The process of the present invention will be further described by reference to illustrative examples, which by no means limit the invention.

The results of the reaction were evaluated in the following manner:

The crude reaction liquid is subjected to an extraction with benzene/water, the extract is subjected to steam distillation to distill out 2,3,6-trimethylbenzoquinone. The product is extracted again with benzene. The extract is concentrated and hydrogenated in the presence of a Pd-C catalyst (5 percent palladium carried on active carbon; a product of Nippon Engelhard, Limited) to isolate 2,3,6-trimethylhydroquinone. The result is shown by yield (g) of 2,3,6-trimethylhydroquinone.

EXAMPLES 1 – 7

In a four-neck flask provided with a thermometer, stirrer, reflux condenser and dropping funnel, 25 parts of acetic acid as solvent, 6 parts of pseudocumene and a catalyst in an amount shown in the following table were charged. The temperature was regulated to be 50°C. 38 parts of peracetic acid solution (1:2 mixed solution of acetic acid and ethyl acetate containing 19 percent of peracetic acid) were charged in the dropping funnel and dropped slowly into the reactor. The reaction was carried out at a temperature kept at 50°C for a period shown in the following table to obtain the result shown in the same table.

TABLE II

| Example | 1 | 2 | 3 | 4 | 5 | 6 | 7 |
|---|---|---|---|---|---|---|---|
| Catalyst | None | $H_2SO_4$ | $HClO_4$ | PTS | $HBF_4$ | $BF_3$ | $HgCl_2$ |
| Amount of catalyst (part) | 0 | 0.7 | 0.7 | 0.7 | 0.7 | 0.35 | 0.7 |
| Reaction time (hr.) | 13 | 11 | 12 | 12 | 12 | 12 | 12 |
| TMBQ Selectivity (%) | Trace | 9.9 | 14.3 | 6.1 | 8.3 | 7.6 | 8.9 |

PTS = p-toluenesulfonic acid
TMBQ: 2,3,6-trimethylbenzoquinone
Selectivity (%) is shown by molar % of resulting 2,3,6-trimethyl-benzoquinone based on pseudocumene consumed.

EXAMPLES 8 – 14

In a four-neck flask provided with a thermometer, stirrer, reflux condenser and dropping funnel, 60 parts of pseudocumene, 7 parts of perchloric acid and 250 parts of a solvent were charged. 380 parts of peracetic acid solution (mixed solution of acetic acid and ethyl acetate containing 19 percent of peracetic acid) were dropped therein slowly through the dropping funnel while temperature was kept at a predetermined value as shown in the following table. The reaction time was as shown in the following table. The results of the reaction were evaluated in the same manner as in Examples 1 – 7.

Table III

| Example | 8 | 9 | 10 | 11 | 12 | 13 | 14 |
|---|---|---|---|---|---|---|---|
| Solvent initially charged | None | Acetic acid | Propionic acid | Chlorobenzene | Dichloromethane | Chloroform | Carbon tetrachloride |
| Reaction temperature (°C) | 60 | 50 | 60 | 50 | 60 | 60 | 60 |
| Reaction time (hr.) | 6 | 12 | 6 | 12 | 6 | 7 | 6 |
| TMBQ selectivity (%) | 5.9 | 12.7 | 13.8 | 12.6 | 18.6 | 17.6 | 16.6 |

EXAMPLE 15

In the same reactor as above, 50 parts of chloroform as reaction solvent, 12 parts of pseudocumene and 2.7 parts of 70 percent perchloric acid solution as catalyst were charged. 76 parts of 30 percent peracetic acid solution (mixed solution of acetic acid and ethyl acetate containing 30 percent of peracetic acid) were dropped slowly through a dropping funnel. The reaction was carried out for 7 hours while the reaction temperature was kept at 60°C. The amounts of converted peracetic acid and pseudocumene were 87.6 percent and 50.2 percent, respectively. The yield of 2,3,6-trimethylbenzoquinone based on the amount of consumed pseudocumene was 25.5 percent.

EXAMPLE 16

The procedure of Example 15 was repeated by using 25 percent perpropionic acid solution. More particularly, 50 parts of chloroform, 12 parts of pseudocumene and 3.4 parts of 70 percent perchloric acid solution as catalyst were charged in a reactor. 108 parts of 25 percent perpropionic acid (propionic acid solution containing 25 percent of perpropionic acid) were dropped therein slowly through a dropping funnel. The reaction was carried out for 7 hours while the reaction temperature was kept at 60°C. The amounts of converted perpropionic acid and pseudocumene were 81.3 percent and 46.9 percent, respectively. The yield of 2,3,6-trimethylbenzoquinone based on the consumed amount of pseudocumene was 23.6 percent.

EXAMPLE 17

The procedure of Example 15 was repeated by using 20 percent perbenzoic acid solution. More particularly, 12 parts of pseudocumene and 4.4 parts of 70 percent perchloric acid solution were charged in a reactor. 207 parts of 20 percent perbenzoic acid solution (chloroform solution containing 20 percent of perbenzoic acid) were dropped therein slowly under cooling. Temperature was elevated slowly under stirring and the reaction was carried out at 60°C for 10 hours. The amounts of converted perbenzoic acid and pseudocumene were 95.3 percent and 53.8 percent, respectively. The yield of 2,3,6-trimethylbenzoquinone based on the converted pseudocumene was 20.5 percent.

EXAMPLE 18

In the same reactor as above, 50 parts of acetic acid as reaction solvent, 12 parts of pseudocumene and 15 parts of nitric acid as catalyst were charged. The temperature was regulated to be 60°C. 94 parts of 24.3 percent peracetic acid solution (mixed solution of acetic acid and ethyl acetate containing 24.3 percent of peracetic acid) were dropped slowly through a dropping funnel. The reaction was carried out for 11 hours while the reaction temperature was kept at 60°C. The amounts of converted peracetic acid and pseudocumene were 93.9 percent and 56.8 percent, respectively. The yield of 2,3,6-trimethylbenzoquinone based on the amount of consumed pseudocumene was 25.4 percent.

EXAMPLE 19

In the same reactor as above, 50 parts of acetic acid as reaction solvent, 6 parts of pseudocumene, 0.6 part of concentrated sulfuric acid and 0.6 part of phosphoric acid as catalyst were charged. The temperature was regulated to be 70°C. 47 parts of 24.3 percent peracetic acid solution (mixed solution of acetic acid and ethyl acetate containing 24.3 percent of peracetic acid) were dropped slowly through a dropping funnel. The reaction was carried out for 6 hours while the reaction temperature was kept at 70°C. The amounts of converted peracetic acid and pseudocumene were 92.5 percent and 23.3 percent, respectively. The yield of 2,3,6-trimethylbenzoquinone based on the amount of consumed pseudocumene was 44.6 percent.

EXAMPLE 20

In the same reactor as above, 50 parts of acetic acid as reaction solvent, 12 parts of pseudocumene, 1.2 parts of 70 percent perchloric acid solution and 1.2 parts of phosphoric acid as catalyst were charged. The temperature was regulated to be 70°C. 94 parts of 24.3 percent peracetic acid solution (mixed solution of acetic acid and ethyl acetate containing 24.3 percent of peracetic acid) were dropped slowly through a dropping funnel. The reaction was carried out for 9 hours while the reaction temperature was kept at 70°C. The amounts of converted peracetic acid and pseudocumene were 93.6 percent and 45.2 percent, respectively. The yield of 2,3,6-trimethylbenzoquinone based on the amount of consumed pseudocumene was 35.3 percent.

The embodiments of the invention in which an exclusive property or privilege is claimed are defined as follows:

1. A process for preparing 2,3,6-trimethylbenzoquinone which comprises reacting pseudocumene with a peracid of pKa of more than 7.0 at a molar ratio of pseudocumene/peracid of 1/1 to 10, in the presence of from 1 to 150 percent by weight, based on the weight of pseudocumene, of an acid catalyst selected from the group consisting of strong acids of pKa of less than 3.0 and Lewis acids, at a temperature of from zero to 100°C.

2. A process according to claim 1, in which the peracid is selected from the group consisting of peracetic acid, perpropionic acid, perbutyric acid, monochlorperacetic acid, perbenzoic acid, perphthalic acid and performic acid.

3. A process according to claim 2, in which the molar ratio of pseudocumene/peracid is from ½ to 5.

4. A process according to claim 1, in which said acid catalyst is selected from the group consisting of perchloric acid, periodic acid, sulfuric acid, nitric acid, p-toluene-sulfonic acid, phosphoric acid, phosphorous acid, boron trifluoride, fluoroboric acid, mercuric chloride, zinc chloride and mixtures thereof.

5. A process according to claim 4, in which the amount of acid catalyst is from 3 to 20 percent by weight, based on the weight of pseudocumene.

6. A process according to claim 1, in which the pseudocumene is dissolved in 3 to 20 times its weight of a solvent selected from the group consisting of lower carboxylic acids and chlorinated hydrocarbons.

7. A process according to claim 6, in which the solvent is selected from the group consisting of acetic acid, propionic acid, butyric acid, chlorobenzene, dichloromethane, chloroform, carbon tetrachloride, trichloroethylene and tetrachloroethylene.

* * * * *